US010488190B2

(12) United States Patent
Schweikl

(10) Patent No.: US 10,488,190 B2
(45) Date of Patent: Nov. 26, 2019

(54) LENGTH-MEASURING DEVICE AND METHOD FOR ASSEMBLING THE SAME

(71) Applicant: DR. JOHANNES HEIDENHAIN GmbH, Traunreut (DE)

(72) Inventor: Konrad Schweikl, Altenmarkt (DE)

(73) Assignee: DR. JOHANNES HEIDENHAIN GMBH, Traunreut (DE)

(*) Notice: Subject to any disclaimer, the term of this patent is extended or adjusted under 35 U.S.C. 154(b) by 292 days.

(21) Appl. No.: 15/663,857

(22) Filed: Jul. 31, 2017

(65) Prior Publication Data

US 2018/0073869 A1 Mar. 15, 2018

(30) Foreign Application Priority Data

Sep. 12, 2016 (EP) .................................... 16188328

(51) Int. Cl.

*G01B 21/02* (2006.01)
*G01D 5/244* (2006.01)
*G01D 5/347* (2006.01)
*G01D 11/24* (2006.01)

(52) U.S. Cl.

CPC ......... *G01B 21/02* (2013.01); *G01D 5/24438* (2013.01); *G01D 5/34769* (2013.01); *G01D 11/245* (2013.01)

(58) Field of Classification Search

CPC .......................... G01B 11/14; G01B 9/02018; G01B 9/02061; G01B 11/002; G01B 21/047; G01B 2210/58; G01B 2290/30; G01B 5/012; G01B 7/30; G01B 9/02015; G01B 9/02049; G01B 11/026

USPC ............................................................ 33/706

See application file for complete search history.

(56) References Cited

U.S. PATENT DOCUMENTS 3,816,003 A * 6/1974 Litke .................. G01D 5/34753 356/395
4,600,203 A 7/1986 Miller et al.
4,982,508 A * 1/1991 Nelle .................. G01B 5/0014 33/702
5,485,680 A * 1/1996 Nelle ................. G01D 5/34769 33/705
6,739,067 B2 * 5/2004 Muller ............... G01D 5/34769 33/703
6,769,195 B2 * 8/2004 Huber ..................... F16C 29/00 33/706

(Continued)

FOREIGN PATENT DOCUMENTS

DE 8423946 U1 11/1987
DE 3402613 C1 1/1991

(Continued)

*Primary Examiner* — Yaritza Guadalupe-McCall
(74) *Attorney, Agent, or Firm* — Leydig, Voit & Mayer, Ltd.

(57) ABSTRACT

A length-measuring device includes a hollow section member having a scale disposed therein. The hollow section member has a slot which extends along the scale, wherein, during position measurement, a drive dog of a scanning unit scanning the scale extends through the slot. The slot is sealed by an elastic seal extending along the hollow section member. A sleeve is attached to at least one end of the seal in a pull-off resistant manner. The sleeve has an axial abutment which is effective in a longitudinal direction of the hollow section member and with which the sleeve bears axially against the hollow section member.

12 Claims, 2 Drawing Sheets

1
4
3
11
+X
-X

(56) References Cited

U.S. PATENT DOCUMENTS 7,185,444 B2 * 3/2007 Falkinger ........... G01D 5/24442 33/706
7,788,821 B2 * 9/2010 Affa ....................... G01D 5/264 33/702
7,856,734 B2 * 12/2010 Affa ................... G01D 5/34753 33/706
8,234,792 B2 * 8/2012 Schenk ............. G01D 5/34761 33/706
8,850,711 B2 * 10/2014 Schenk ............. G01D 5/34753 33/712
8,997,367 B2 * 4/2015 Schmoller .......... G01D 5/34761 33/706
8,997,368 B2 * 4/2015 Kummetz .......... G01D 5/24442 33/770
9,234,734 B2 * 1/2016 Schmoller ................ G01B 5/02
9,395,215 B2 * 7/2016 Motoyuki .......... G01D 5/34746
10,077,841 B2 * 9/2018 Driker .................. F16J 15/3232
10,234,277 B2 * 3/2019 Peterlechner ...... G01D 5/34753
2002/0129508 A1 * 9/2002 Blattner ................ F16C 29/005 33/706
2003/0182816 A1 * 10/2003 Huber ..................... F16C 29/00 33/707
2003/0200671 A1 * 10/2003 Muller ............... G01D 5/34769 33/706
2011/0072676 A1 * 3/2011 Schenk ............. G01D 5/34769 33/707
2013/0019489 A1 * 1/2013 Kummetz .......... G01D 5/24442 33/770
2016/0011017 A1 * 1/2016 Hayashi ............ G01D 5/34753 33/707
2016/0054151 A1 2/2016 Nozawa
2017/0199060 A1 * 7/2017 Shimoda ................ G01D 11/10
2018/0073637 A1 * 3/2018 Driker ................ G01D 5/34761
2018/0073869 A1 * 3/2018 Schweikl ............... G01B 21/02

FOREIGN PATENT DOCUMENTS

DE 102015010349 A1 2/2016
EP 0158050 A1 10/1985
WO WO 2010078984 A1 7/2010

* cited by examiner

LENGTH-MEASURING DEVICE AND METHOD FOR ASSEMBLING THE SAME

CROSS-REFERENCE TO PRIOR APPLICATION

Priority is claimed to European Patent Application No. EP 16188328.5, filed on Sep. 12, 2016, the entire disclosure of which is hereby incorporated by reference herein.

FIELD

The present invention relates to a length-measuring device having a hollow section member with a scale disposed therein and further having a slot which extends along the scale and through which a drive dog of a scanning unit scanning the scale extends during position measurement, the slot being sealed by an elastic seal extending along the hollow section member, and further relates to a method for assembling the length-measuring device.

BACKGROUND

DE 34 02 613 C1 discloses a length-measuring device of the above-mentioned type. The length-measuring device includes a hollow section member in which a scale extends in the longitudinal direction. During measurement operation, the scale is scanned by a scanning unit, which is attached to an object to be measured via a drive dog. The drive dog extends through a seal that seals an opening extending in the longitudinal direction of the hollow section member. The seal is attached to the hollow section member in such a manner that it is stretched in the longitudinal direction. Attachment of the seal is accomplished by clamping using a screw and a clamping plate.

SUMMARY

In an embodiment, the present invention provides a length-measuring device including a hollow section member having a scale disposed therein. The hollow section member has a slot which extends along the scale, wherein, during position measurement, a drive dog of a scanning unit scanning the scale extends through the slot. The slot is sealed by an elastic seal extending along the hollow section member. A sleeve is attached to at least one end of the seal in a pull-off resistant manner. The sleeve has an axial abutment which is effective in a longitudinal direction of the hollow section member and with which the sleeve bears axially against the hollow section member.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
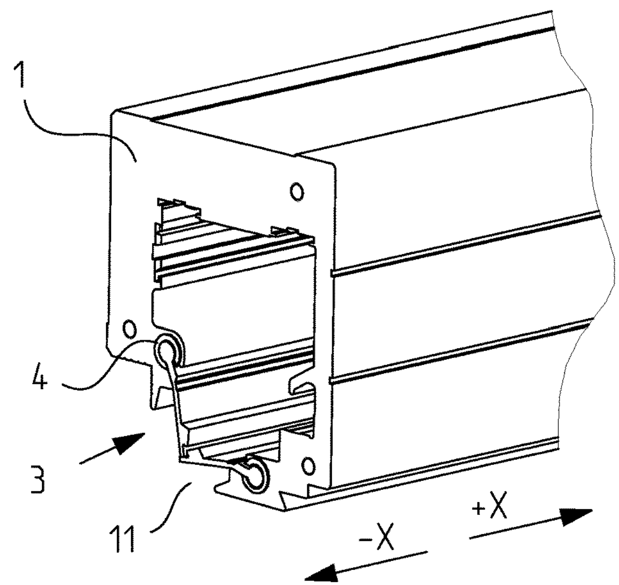
FIG. 1 is a perspective view of a length-measuring device.
Figure 2:
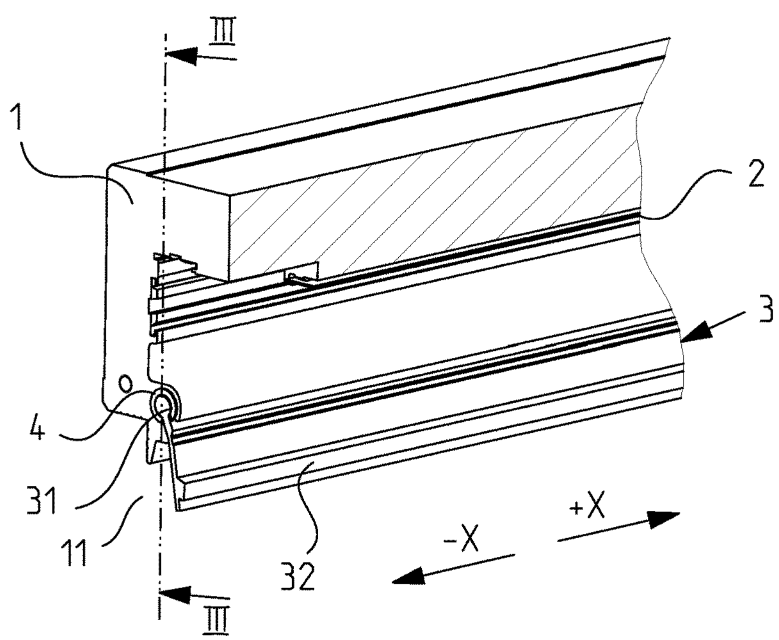
FIG. 2 is a longitudinal sectional view of the length-measuring device of FIG. 1.

The inventor has recognized that a disadvantage of the prior art construction is that a transverse bore must be formed in the hollow section member for the screw, and that, because of the transverse bore and the undefined deformation of the seal caused by the screw, there is a risk of leakage occurring in the hollow section member.

In an embodiment, the present invention provides a length-measuring device in which sealing of the hollow section member is facilitated and improved.

The length-measuring device designed in accordance with an embodiment of the present invention includes a hollow section member having a scale disposed therein and further having a slot which extends along the scale and through which a drive dog of a scanning unit scanning the scale extends during position measurement. This slot is sealed by an elastic seal extending along the hollow section member. A sleeve is attached to the seal in a pull-off resistant manner at least at one end thereof. The sleeve has an axial abutment which is effective in the longitudinal direction of the hollow section member and with which the sleeve bears axially against the hollow section member at the end thereof; i.e., preferably directly against the end face of the hollow section member, or alternatively at a longitudinal position in the region of the end of the hollow section member.

"Pull-off resistant" means that the sleeve is interlockingly and/or frictionally connected to the seal such that it is immovable in a least one of the longitudinal directions.

The sleeve is axially supported on the hollow section member at the end thereof in such a way that the seal can be mounted such that it is tensioned or stretched along the hollow section member. To this end, the axial abutment of the sleeve faces toward the hollow section member. Thus, the abutment prevents axial displacement of the sleeve toward the hollow section member, thereby also retaining seal to the hollow section member at the end thereof.

It is particularly advantageous if the seal is disposed on the hollow section member alongside thereof by each one of the sleeves being attached to a respective one of the two ends of the seal in a pull-off resistant manner and the abutment of each of the sleeves bearing against the hollow section member at a respective end thereof. This measure allows the seal to be stretched, if necessary, in the longitudinal direction; i.e., along the hollow section member. The elongation is, for example, 1% to 3% of the length of the seal in the unstretched state.

It is advantageous if the seal is only fixed at the two ends or in the two end regions of the hollow section member by means of the sleeves, and if, in the remaining region between the two ends, the seal extends in a groove of the hollow section member. During assembly, the seal is drawn into this groove from the end face of the hollow section member.

If the pull-off resistant connection is achieved by an interlocking fit between the sleeve and the seal, it is advantageous for the sleeve to have at least one inwardly directed projection that penetrates into the seal.

The interlocking fit can be created particularly advantageously if the at least one projection has a first shape extending in one longitudinal direction (+X) and a second shape facing in the opposite direction (−X). The first shape is configured like a ramp which allows the sleeve to be pushed onto the seal in the one longitudinal direction (+X), and the second shape provides a resistance that prevents, or at least hinders, the sleeve from being displaced relative to the seal in a direction opposite to the one longitudinal direction; i.e., in the opposite direction (−X).

In order to improve the interlocking fit, the sleeve may have a plurality of inwardly directed projections spaced apart in the longitudinal direction.

In many cases, the slot of the hollow section member is covered by sealing lips arranged in a roof-like manner. In such cases, a sealing lip is disposed on each side of the slot in a respective groove of the hollow section member. The sealing lip includes a longitudinally extending bead and a lip integrally formed therewith. The bead is inserted in the groove of the hollow section member, and the lip extends into the slot of hollow section member and covers it at least partially. For the purpose of fixing a seal in the form of such a sealing lip, the sleeve has a slot, the sleeve embracing the bead, and the lip extending through the slot of the sleeve into the slot of the hollow section member. The sleeve is inserted at the end face into the groove extending along the hollow section member. To this end, at the end of the hollow section member, the groove may, if necessary, have a cross section that is matched to the sleeve and larger than in the region where only the bead of the sealing lip is located in the groove. Instead of a groove, a longitudinally extending bore may be formed in the end of the hollow section member from the end face thereof to receive the sleeve.

The sealing lip is advantageously made of an elastic plastic material. The elasticity of the sealing lip causes the bead of the sealing lip to radially preload the sleeve such that it is elastically resiliently urged along its circumference against the inner surface of the longitudinally extending groove or bore of the hollow section member. This ensures effective sealing between the hollow section member and the sleeve.

Advantageously, the abutment of the sleeve is a radially outwardly directed flange of the sleeve. If this flange is circumferentially continuous, it covers the circumferentially extending contact region between the sleeve and the groove or bore of the hollow section member at the end, thus enhancing the sealing between the sleeve and the hollow section member.

The abutment of the sleeve is not necessarily external of the hollow section member, but may alternatively also be formed at a different longitudinal position of the sleeve, such as, for example, at the inner end of the sleeve.

In another embodiment, the present invention provides a method that permits easy assembly of the length-measuring device.

This method includes the following steps:

- providing a hollow section member having a longitudinally extending slot through which a drive dog of a scanning unit scanning a scale disposed within the hollow section member extends during position measurement;
- providing an elastic seal with which the slot can be sealed;
- attaching a sleeve to the seal in a pull-off resistant manner at least at one end thereof, the sleeve having an axial abutment which is effective in the longitudinal direction of the hollow section member;
- subsequently positioning the sleeve on the hollow section member such that the abutment of the sleeve bears against the hollow section member.

The present invention is described below with reference to an exemplary embodiment.

This length-measuring device includes a hollow section member 1 having a sealed slot 11. During position measurement, a scanning unit is disposed within hollow section member 1 and attached to an object to be measured via a drive dog extending through an elastic seal 3 and slot 11. For purposes of position measurement, the drive dog of the scanning unit is mounted to a first object to be measured, and hollow section member 1 is mounted to a second object to be measured, which is movable relative to the first object to be measured in longitudinal direction X. Longitudinal direction X corresponds to the measurement direction.

A scale 2 is disposed inside hollow section member 1 such that it extends in longitudinal direction X. Scale 2 is made, for example, of glass, glass-ceramic or steel. Scale 2 may also be a steel tape. Scale 2 carries a measuring graduation on its upper side; i.e., the side located opposite the scanning unit and facing the same. During measurement operation, the measuring graduation is scanned, preferably photoelectrically, by the scanning unit. In this process, the scanning unit generates position-dependent scanning signals. The measuring graduation may also be designed to be scannable magnetically, inductively or capacitively, and may be an incremental or absolute measuring graduation.

As shown in FIG. 1, seal 3 of the exemplary embodiment is composed of two sealing lips arranged in a roof-like manner. In accordance with the present invention, the sealing lips are each attached to hollow section member 1 and contact each other at the center of slot 11 of hollow section member 1, closing slot 11. Seal 3 may also be formed by a single sealing element. Thus, slot 11 may, for example, be covered by a seal in the form of a single sealing lip.

Seal 3 is fixed to hollow section member 1 by means of a sleeve 4. For this purpose, sleeve 4 is connected to seal 3 in a pull-off resistant manner and has an abutment 41. In the mounted state, sleeve 4 bears against hollow section member 1 in longitudinal direction X at the end thereof, thereby fixing sleeve 4 to hollow section member 1.

Seal 3 may also be attached to hollow section member 1 in such a manner that it is tensioned or stretched in longitudinal direction X by each one of sleeves 4 being mounted on a respective one of the two ends of seal 3 in a pull-off resistant manner and abutment 41 of each of sleeves 4 bearing against hollow section member 1 at a respective end thereof, tensioning seal 3.

Figure 3:
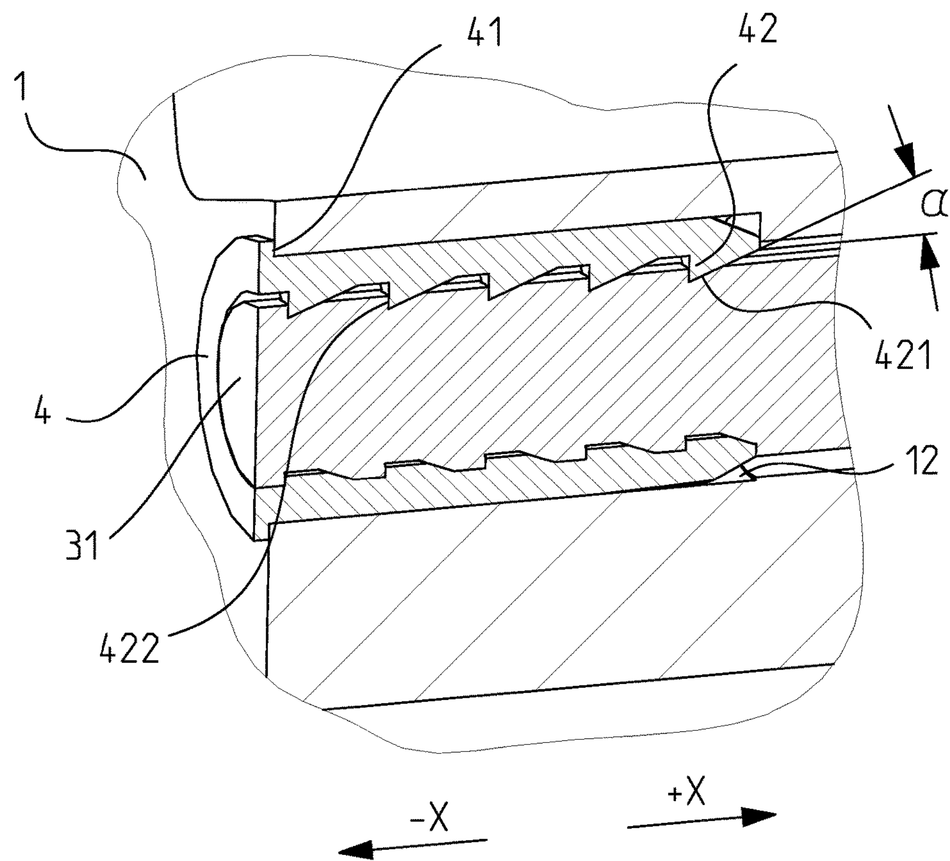
FIG. 3 is a longitudinal sectional view showing the length-measuring device of FIGS. 1 and 2 in the region where the seal is attached to the hollow section member.
Figure 4:
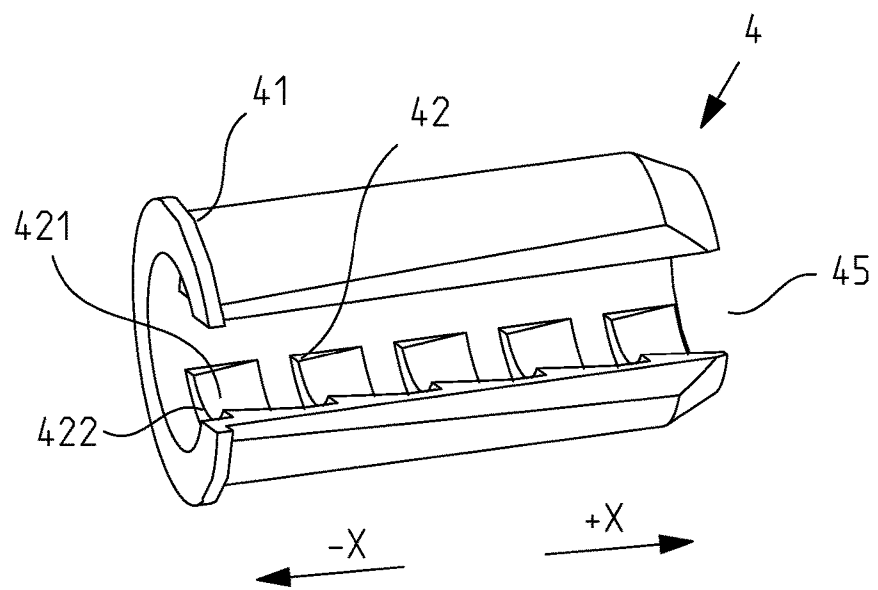
FIG. 4 is a perspective view of the sleeve for attaching the seal to the hollow section member.

Details of sleeve 4 are illustrated in FIGS. 3 and 4. Sleeve 4 has at least one inwardly directed projection 42 that penetrates into the material of seal 3. As a result of projection 42 penetrating into seal 3, seal 3 is elastically deformed, thereby creating the pull-off resistant connection between sleeve 4 and seal 3. A particularly suitable material for seal 3 is an elastic plastic material. Particularly suitable materials for sleeve 4 include plastic and also metal.

Projection 42 of sleeve 4 preferably has a first shape 421 extending in longitudinal direction X and forming a ramp that allows sleeve 4 to be displaced relative to seal 3 in longitudinal direction +X. This measure makes it possible to push sleeve 4 onto seal 3 to the desired position. The angle of inclination a of first shape 421 is, for example, about 20°.

Projection 42 of sleeve 4 preferably further has a second shape 422 which faces in the opposite direction and provides a resistance that prevents sleeve 4 from being displaced on seal 3 in opposite direction −X. This resistance allows seal 3 to be positioned and fixed on sleeve 4 in a simple way. For this purpose, the angle of inclination of second shape 422 is greater than that of first shape 421 and is, for example, about 90°. Seal 3 is fixed to hollow section member 1 by sleeve 4 bearing with its abutment 41 against hollow section member 1.

It is advantageous if sleeve 4 has a plurality of inwardly directed projections 42 that are spaced apart in longitudinal direction X and penetrate into seal 3, thereby creating the pull-off resistant connection between sleeve 4 and seal 3.

As shown in FIG. 3, sleeve 4, together with seal 3 held therein, is disposed in a groove 12 of hollow section member 1 that extends in longitudinal direction X.

The present invention may be used particularly advantageously if seal 3 is a sealing lip including a bead 31 extending in longitudinal direction X and a lip 32 extending therefrom. In this case, it is also advantageous if the sleeve 4 has a slot 45. Sleeve 4 and slot 45 are dimensioned such that sleeve 4 surrounds bead 31, and lip 32 of seal 3 extends through slot 45 of sleeve 4 into slot 11 of hollow section member 1. In addition, slotted sleeve 4 has the advantage that its circumferential surface conforms under tension to groove 12, thereby reliably sealing the same outwardly. Since seal 3, and thus the sealing lip, is made of elastic material, bead 31 of the sealing lip radially preloads slotted sleeve 4 in such a way that, when positioned in groove 12, sleeve 4 is elastically resiliently urged along its circumference against the inner surface of groove 12.

Along the further extent of seal 3 into hollow section member 1, the seal is drawn into groove 12, so that bead 31 provides sealing between seal 3 and the interior of the hollow section member 1.

The sealing between seal 3 and hollow section member 1 can be further enhanced by configuring abutment 41 of sleeve 4 as a radially outwardly directed circumferential flange or shoulder of sleeve 4. This circumferential flange covers the circumferentially extending contact region between sleeve 4 and hollow section member 1 at the end. This sealing at the end is further enhanced by providing such a sleeve 4 at both ends of hollow section member 1 and by fixing seal 3 to hollow section member 1 in a stretched state by means of the two sleeves 4. As a result, the circumferential flange of each sleeve 4 forming the respective axial abutment 41 is resiliently urged against hollow section member 1.

A method for assembling this length-measuring device will now be explained in even more detail with reference to the above-described length-measuring device.

This method includes the following steps:

- providing a hollow section member 1 having a longitudinally extending slot 11 through which a drive dog of a scanning unit scanning a scale 2 disposed within the hollow section member extends during position measurement;
- providing an elastic seal 3 with which slot 11 can be sealed;
- attaching the sleeve 4 to seal 3 in a pull-off resistant manner, the sleeve 4 having an axial abutment 41;
- subsequently positioning sleeve 4 on hollow section member 1 such that abutment 41 of sleeve 4 bears axially against hollow section member 1 at the end thereof.

The positioning of sleeve 4 on hollow section member 1 is accomplished by pushing or pressing sleeve 4 into a longitudinally extending groove 12 of hollow section member 1 from the end face of hollow profile section 1. This allows seal 3 to be fixed to hollow section member 1 at the end thereof in a particularly easy manner because only the end face needs to be accessible.

If sleeve 4 is configured in accordance with the exemplary embodiment shown in FIG. 4, the pull-off resistant connection between seal 3 and sleeve is created by the following step:

- pushing sleeve 4 onto seal 3 in longitudinal direction +X; i.e., against first shape 421, which is configured as a ramp.

Scale 2 may be mounted in hollow section member 1 prior to installing seal 3 or subsequent to installing seal 3. If scale 2 is a scale tape, it is advantageous to insert it into hollow section member 1 subsequent to installing seal 3, for example, by drawing it into a groove provided in hollow section member 1.

The present invention may also be advantageously used in length-measuring devices where hollow section member 1 is composed of a plurality of sections abutting against one another. In such devices, scale 2 may also be composed of sections. However, it is particularly advantageous if the scale 2 used is a scale tape that extends, in particular in a tensioned state, over all sections of hollow section member 1. In this case, seal 3 may extend over this plurality of sections, for example, also in a tensioned state, and a sleeve 4 may be provided only at each of the two ends of the overall assembly.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article “a” or “the” in introducing an element should not be interpreted as being exclusive of a plurality of elements. Likewise, the recitation of “or” should be interpreted as being inclusive, such that the recitation of “A or B” is not exclusive of “A and B,” unless it is clear from the context or the foregoing description that only one of A and B is intended. Further, the recitation of “at least one of A, B and C” should be interpreted as one or more of a group of elements consisting of A, B and C, and should not be interpreted as requiring at least one of each of the listed elements A, B and C, regardless of whether A, B and C are related as categories or otherwise. Moreover, the recitation of “A, B and/or C” or “at least one of A, B or C” should be interpreted as including any singular entity from the listed elements, e.g., A, any subset from the listed elements, e.g., A and B, or the entire list of elements A, B and C.

What is claimed is:

1. A length-measuring device, comprising:

a hollow section member having a scale disposed therein, the hollow section member having a slot which extends along the scale, wherein, during position measurement, a drive dog of a scanning unit scanning the scale extends through the slot, the slot being sealed by an elastic seal extending along the hollow section member; and a sleeve attached to at least one end of the seal in a pull-off resistant manner, the sleeve having an axial abutment which is effective in a longitudinal direction of the hollow section member and with which the sleeve bears axially against the hollow section member.

2. The length-measuring device as recited in claim 1, wherein the seal extends along the hollow section member from a first end to a second end, wherein the sleeve is attached to each of the two ends of the seal, and wherein the seal is disposed in a stretched state along the hollow section member by each one of the sleeves being attached to a respective one of the two ends of the seal in a pull-off resistant manner and the abutment of each of the sleeves bearing axially against the hollow section member at a respective end thereof.

3. The length-measuring device as recited in claim 1, wherein the pull-off resistant connection between the sleeve and the seal is formed by at least one inwardly directed projection of the sleeve that penetrates into the seal.

4. The length-measuring device as recited in claim 3, wherein the at least one projection has a first shape extending in the longitudinal direction and a second shape facing in an opposite direction to the longitudinal direction, the first shape forming a ramp that allows the sleeve to be pushed onto the seal in the longitudinal direction, and the second shape providing a resistance that prevents the sleeve from being displaced relative to the seal in the opposite direction, such that the at least one projection forms the pull-off resistant connection between the seal and the sleeve.

5. The length-measuring device as recited in claim 3, wherein the sleeve has a plurality of the inwardly directed projections that are spaced apart in the longitudinal direction and penetrate into the seal.

6. The length-measuring device as recited in claim 1, wherein the sleeve has a slot, and the seal is a sealing lip including a longitudinally extending bead and a lip integrally formed therewith, the sleeve embracing the bead, and the lip extending through the slot of the sleeve into the slot of the hollow section member.

7. The length-measuring device as recited in claim 1, wherein the sleeve is disposed in a groove or bore extending along the hollow section member.

8. The length-measuring device as recited in claim 7, wherein the sleeve has a slot, and the seal is a sealing lip including a longitudinally extending bead and a lip integrally formed therewith, the sleeve embracing the bead, and the lip extending through the slot of the sleeve into the slot of the hollow section member, the bead of the sealing lip radially preloading the sleeve such that the sleeve is elastically resiliently urged along a circumference of the sleeve against an inner surface of the groove or bore of the hollow section member.

9. The length-measuring device as recited in claim 7, wherein the abutment of the sleeve is a radially outwardly directed flange of the sleeve.

10. A method for assembling a length-measuring device, comprising:

providing a hollow section member having a longitudinally extending slot through which a drive dog of a scanning unit scanning a scale disposed within the hollow section member extends during position measurement;

providing an elastic seal with which the slot is sealable;

attaching a sleeve to at least one end of the seal in a pull-off resistant manner, the sleeve having an axial abutment which is effective in a longitudinal direction of the hollow section member; and then positioning the sleeve on the hollow section member such that the abutment of the sleeve bears axially against the hollow section member.

11. The method as recited in claim 10, wherein the positioning of the sleeve on the hollow section member is accomplished by pushing the sleeve into a longitudinally extending groove or bore of the hollow section member from an end face at an end of the hollow profile section.

12. The method as recited in claim 10, wherein the sleeve has at least one inwardly directed projection that has a first shape extending in the longitudinal direction and a second shape facing in an opposite direction to the longitudinal direction, the first shape forming a ramp that allows the sleeve to be pushed onto the seal, and the second shape providing a resistance that prevents the sleeve from being displaced relative to the seal in the opposite direction, the pull-off resistant connection between the seal and sleeve being created by pushing the sleeve onto the seal in the longitudinal direction such that the at least one projection penetrates into the seal.

* * * * *